US007587489B2

(12) United States Patent
Koie

(10) Patent No.: US 7,587,489 B2
(45) Date of Patent: Sep. 8, 2009

(54) EMERGENCY REPORT DEVICE

(75) Inventor: Yoshio Koie, Handa (JP)

(73) Assignee: Denso Corporation, Kariya (JP)

( * ) Notice: Subject to any disclaimer, the term of this patent is extended or adjusted under 35 U.S.C. 154(b) by 507 days.

(21) Appl. No.: 11/446,757

(22) Filed: Jun. 5, 2006

(65) Prior Publication Data

US 2006/0294229 A1 Dec. 28, 2006

(30) Foreign Application Priority Data

Jun. 24, 2005 (JP) ............................ 2005-184829

(51) Int. Cl.
*G06F 15/173* (2006.01)
*G06F 15/16* (2006.01)

(52) U.S. Cl. ..................... 709/224; 709/203; 455/404.1

(58) Field of Classification Search ......... 709/202-203, 709/223-224; 455/404.1-404.2
See application file for complete search history.

(56) References Cited

U.S. PATENT DOCUMENTS

| | | | | |
|---|---|---|---|---|
| 6,262,655 | B1 | 7/2001 | Yoshioka et al. | |
| 7,127,229 | B2 * | 10/2006 | Baba et al. | 455/404.1 |
| 7,149,774 | B2 * | 12/2006 | Zellner et al. | 709/203 |
| 7,221,928 | B2 * | 5/2007 | Laird et al. | 455/404.1 |
| 7,233,783 | B2 * | 6/2007 | Usui | 455/404.2 |
| 7,274,924 | B2 * | 9/2007 | Yoshioka | 455/404.1 |
| 7,486,947 | B2 * | 2/2009 | Katsumata et al. | 455/412.1 |

* cited by examiner

*Primary Examiner*—Bharat N Barot
(74) *Attorney, Agent, or Firm*—Harness, Dickey & Pierce, PLC

(57) ABSTRACT

Transmission of an emergency report from an emergency report device is either permitted or prohibited depending on a registration condition of an identification code received by the emergency report device from an external device. The registration condition of the identification code in a service center is notified from the emergency report device to a user as a guidance message.

8 Claims, 3 Drawing Sheets

EMERGENCY REPORT DEVICE

CROSS REFERENCE TO RELATED APPLICATION

This application is based on and claims the benefit of priority of Japanese Patent Application No. 2005-184829 filed on Jun. 24, 2005, the disclosure of which are incorporated herein by reference.

FIELD OF THE INVENTION

The present invention generally relates to an emergency report device used in an emergency report system.

BACKGROUND OF THE INVENTION

Conventionally, an emergency report device that transmits an emergency signal to a service center in an occasion such as an emergency button operation by a user, an airbag deployment or the like maintains an identification number (ID number) received from an external device such as a navigation system. That is, the identification number that is originally assigned to the navigation system is copied from the navigation system to the emergency report device and is stored in the device. The user of the emergency report device can receive a designated service such as an emergency report service only when the ID number sent to the service center matches the registered ID number in the center.

Japanese Patent Document JP3,115,283 discloses an emergency report device that changes the stored ID number when a new external device is connected to the emergency report device.

The external device such as the navigation system is replaced when the device is not working properly. In this case, the emergency report device receives and stores a new ID number from a newly replaced navigation system connected thereto. However, the new ID number does not match the registered ID number in the service center until registration of the new ID in the service center, thereby preventing the user from receiving the designated service provided by the emergency report system.

SUMMARY OF THE INVENTION

In view of the above-described and other problems, the present invention provides an emergency report device that maintains an absence of a designated service by notifying the absence to a user of the emergency report device for user's convenience.

The emergency report device uses a receiver for receiving an ID code from an external device, compares the ID code with a stored ID code in the device, and determines whether the ID code is registered in a service center for providing a service. When the ID code is not identical with the stored ID code in the emergency report device, emergency report operation of the emergency report device corresponding to an emergency report transmission trigger is prohibited until registration of the ID code in the service center is confirmed, and the non-registration condition of the ID code provided from the external device is notified to the user.

Therefore, usability of the emergency report device is improved, because the user of the emergency report device is appropriately notified of absence of the service in a timely manner when, for example, the external device connected to the emergency report device is replaced due to a breakdown or the like. That is, the emergency report device in a non-operation condition is appropriately recognized by the user because of the above-described scheme of operation.

In another aspect of the emergency report device of the present invention, when the ID code from the external device is identical with the stored ID code, the emergency report operation of the emergency report device corresponding to an emergency report transmission trigger is allowed, and the registration condition of the ID code provided from the external device is notified to the user.

Therefore, usability of the emergency report device is improved, because the service from the service center is provided for the user of the emergency report device with notification of registration of the ID code in the service center. In this manner, availability of the service for the user of the emergency report device is notified to the user in a timely manner for user's convenience. That is, resumed service of the emergency report device is appropriately recognized by the user because of the above-described scheme of operation.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings. Like parts have like numbers in each of the embodiments.

Figure 1:
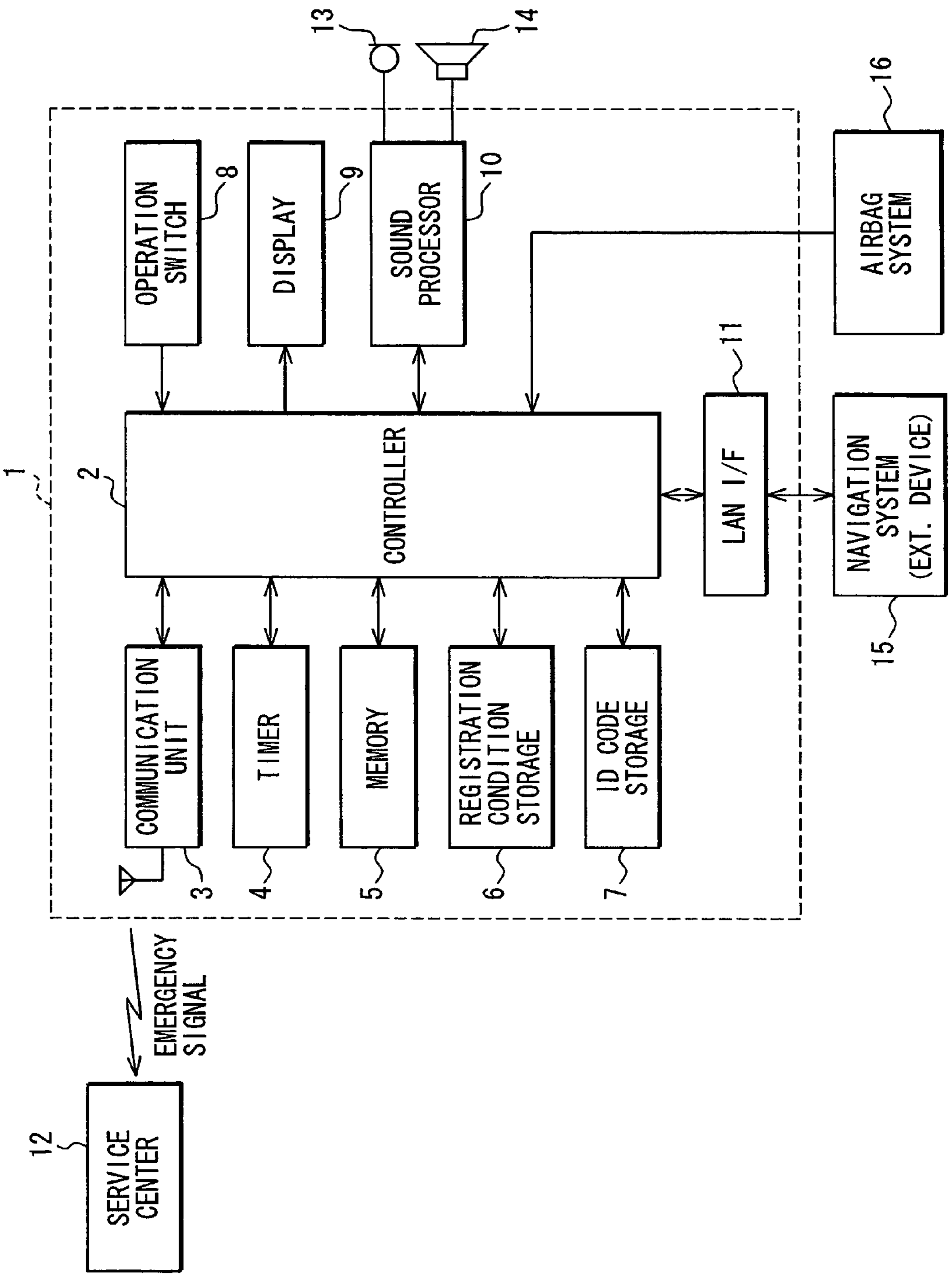
FIG. 1 shows a block diagram of an emergency report device in an embodiment of the present invention.

FIG. 1 shows a block diagram of an emergency report device 1 in an embodiment of the present invention. The emergency report device 1 includes a controller 2, a communication unit 3, a timer 4, a memory 5, a registration condition storage 6, an ID code storage 7, an operation button 8, a display 9, a sound processor 10, and a LAN interface 11.

The controller 2 includes a CPU and other components for controlling operation of the emergency report device 1. The communication unit 3 transmits an emergency signal to a service center 12 through a wireless communication network. In this case, the emergency signal includes an identification code (ID code) for identifying the emergency report device 1, a vehicle position, a time stamp, an emergency index and the like as an attribute of transmitted information.

The timer 4 counts elapsed time upon receiving an instruction from the controller 2. The memory 5 stores various information for later use. The ID code storage 7 stores the ID code of the emergency report device 1. The registration condition storage 6 stores a registration condition of the ID code in the service center 12. That is, the registration condition of the ID code is stored in the registration condition storage 6 as either of a "REG" condition that represents a registered ID code in the service center 12 matches the ID code transmitted from the emergency report device 1, or a "NO-REG" condition that represents absence of registration of the ID code transmitted from the emergency report device 1 in the service center 12.

The operation button 8 outputs an operation signal to the controller 2 upon receiving an operation of an emergency button. The display 9 displays information according to a display signal from the controller 2. The sound processor 10 processes outbound voice sound inputted from a microphone 13 for transmission or inbound voice data for output from a speaker 14. In this case, a user of the emergency report device 1 can communicate with an operator in the service center 12 by using the microphone 13 and the speaker 14 once a communication between the emergency, report device 1 and the service center 12 is established upon transmission of the emergency signal from the emergency report device 1 to the service center 12. In this manner, the user of the emergency report device 1 can ask for assistance orally, or can report a current situation in which the user is involved.

The LAN interface 11 provides an interface with a vehicle LAN, and exchanges various information with a navigation system 15 in the present embodiment. An airbag system 16 outputs a deployment signal to the controller 2 when an airbag is deployed.

The emergency report device 1 may be constructed as a combination of modules in the above system structure. An emergency report operation of the emergency report device 1 in the present embodiment is triggered by an output signal from the operation button 8 upon detecting emergency button operation, or by an output of the deployment signal from the airbag system 16.

Operation of the emergency report device 1 is described with reference to FIGS. 2 and 3 for following situations. That is, two situations are described in the present embodiment.

(1) Startup of the navigation system 15; and (2) Confirmation of ID code registration by the user.

(Situation 1: Startup of the Navigation System 15)

Figure 2:
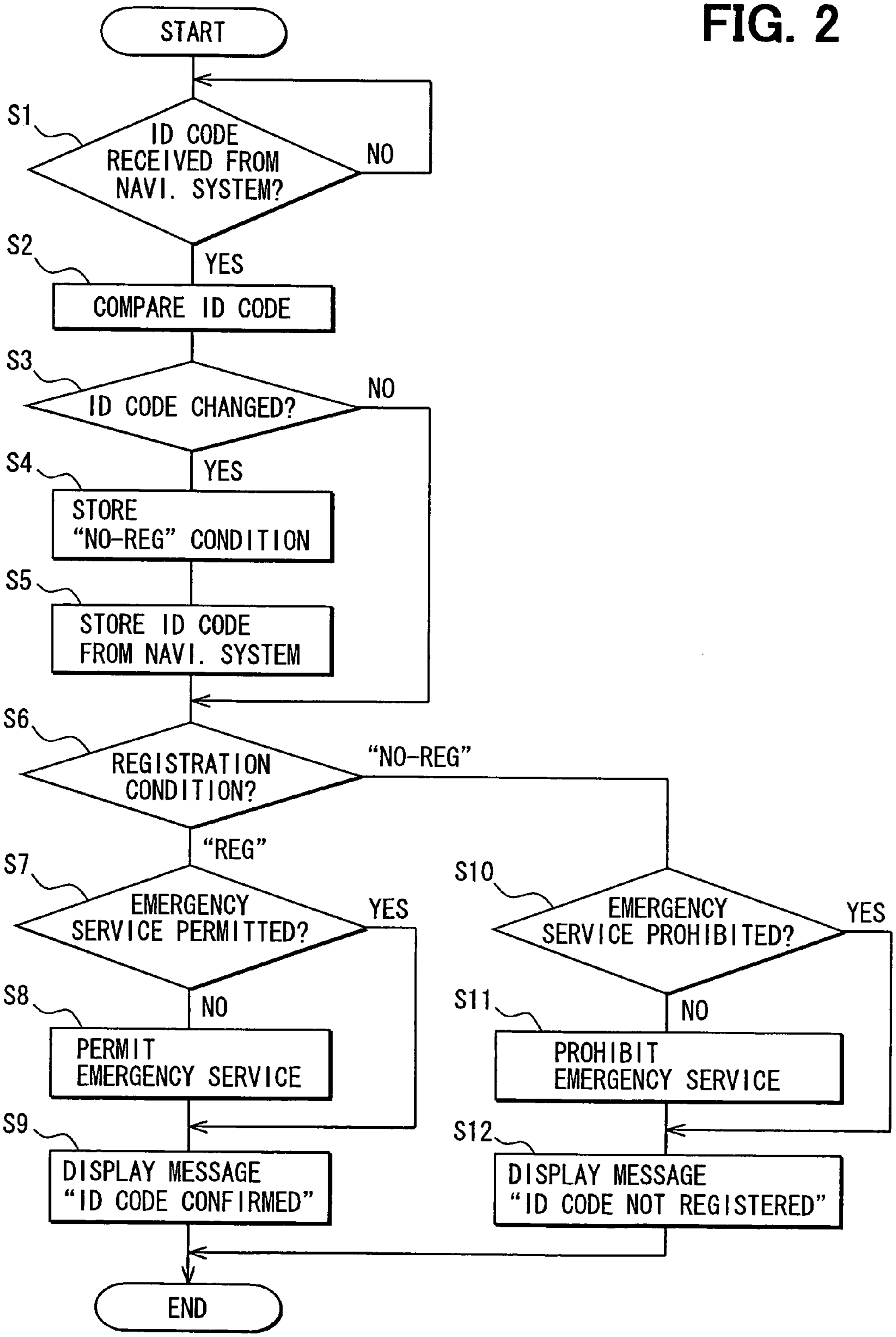
FIG. 2 shows a flowchart of operation process of the emergency report device.

FIG. 2 shows a flowchart of operation process of the emergency report device 1. The navigation system 15 transmits the ID code that is unique for each system to the emergency report device 1 through the vehicle LAN every time the navigation system 15 is turned on (power of the system 15 is activated).

In steps S1 and S2, the controller 2 in the emergency report device 1 receives the ID code from the navigation system 15 (step S1:YES), and compares the ID code with the code stored in the ID code storage 7. In step S3, the controller 2 determines, by the comparison, whether the ID code is changed. When the ID code is changed (step S3:YES), the process proceeds to step S4. The process proceeds to step S6 when the ID code is not changed (step S3:NO).

In step S4, the controller 2 stores the "NO-REG" condition in the registration condition storage 6. The process proceeds to step S5 after storing the "NO-REG" condition.

In step S5, the controller 2 stores the ID code from the navigation system 15 through the LAN interface 11 in the ID code storage 7. The process proceeds to step S6 after storing the ID code in the storage 7.

In step S6, the controller 2 retrieves and determines the registration condition of the ID code in the service center 12. The process proceeds to step S7 when the ID code is registered in the service center 12 (step S6:"REG" [registered]). The process proceeds to step S10 when the ID code is not registered in the service center 12 (step S6:"NO-REG" [not registered])

In step S7, the controller 2 determines whether the emergency report operation of the emergency report device 1 corresponding to an emergency report transmission trigger is permitted. The process proceeds to step S9 when the emergency report operation is permitted (step S7:YES). The process proceeds to step S8 when the emergency report operation is not permitted (step S7:NO).

In step S8, the controller 2 permits the emergency report operation of the emergency report device 1 corresponding to the emergency report transmission trigger.

In step S9, the controller 2 displays a message that represents registration of the ID code in the service center 12 on the display 9. The message may take a form of a text message such as "ID code registered in the service center."

In step S10, the controller 2 determines whether the emergency report operation of the emergency report device 1 corresponding to an emergency report transmission trigger is prohibited. The process proceeds to step S12 when the emergency report operation is prohibited (step S10:YES). The process proceeds to step S11 when the emergency report operation is not prohibited (step S10:NO).

In step S11, the controller 2 prohibits the emergency report operation of the emergency report device 1 corresponding to the emergency report transmission trigger.

In step S12, the controller 2 displays a message that represents absence of registration of the ID code in the service center 12 on the display 9. The message may take a form of a text message such as "ID code not registered in the service center."

In the above-described manner, operation of the emergency report device 1 is changed depending on the ID code transmitted from the navigation system 15 to the emergency report device 1. That is, when the ID code is changed, the ID code is stored in the device 1 in association with "NO-REG" registration condition, and the operation of the emergency report device 1 upon receiving the emergency report transmission trigger is prohibited with provision of ID code not-registered condition message. When the ID code is not changed, the "REG" registration condition is stored in the device 1 without the ID code from the navigation system 15 , and the operation of the emergency report device 1 upon receiving the emergency report transmission trigger is permitted with provision of ID code registered condition message. In this manner, the emergency report device 1 serves the user with recognition of registration condition of the ID code in the service center 12, thereby enabling the user to be disposed in a well-informed condition in terms of the availability of the emergency report service in such a case as an operation of the emergency button, deployment of the airbag or the like.

(Situation 2: Confirmation of ID Code Registration by the User)

In the following description, user's operation for confirming registration of the ID code in the service center 12 is explained with reference to the drawings.

Figure 3:
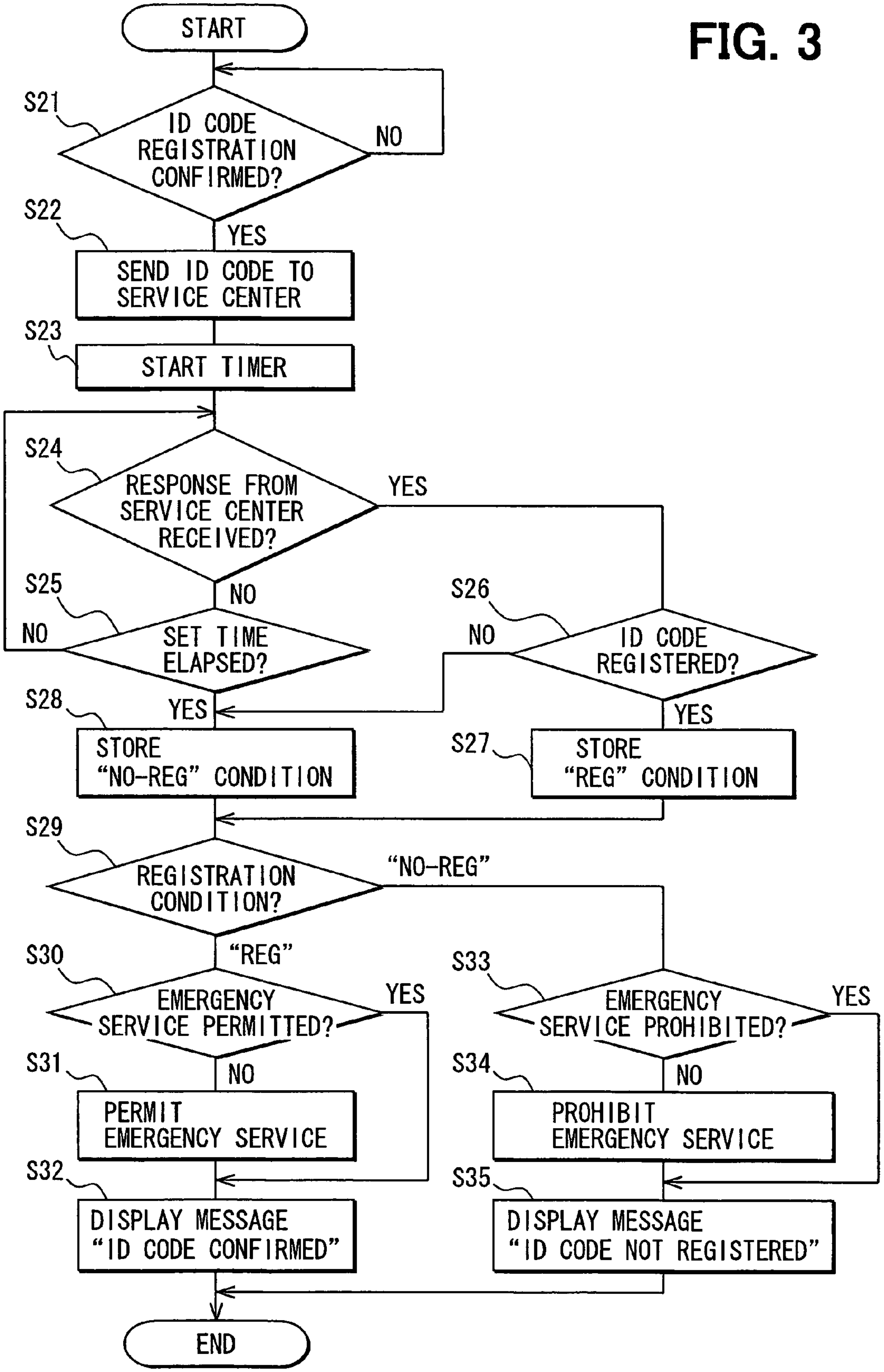
FIG. 3 shows another flowchart of operation process of the emergency report device.

FIG. 3 shows a flowchart of operation process of the emergency report device 1.

In step S21, the controller 2 in the emergency report device 1 determines whether registration confirmation operation is conducted by using the operation button 8. When confirmation operation is detected (step S21:YES), the ID code stored in the ID code storage 7 is transmitted to the service center 12 through the communication unit 3 in step S22. The process proceeds to step S23 after transmission. When confirmation operation is not detected (step S21 :NO), the process repeats step S21.

In step S23, the timer 4 starts to count elapsed time after the transmission of the ID code. The elapsed time is used to limit a response time from the service center 12.

In step S24, the controller 2 determines whether a response from the service center 12 is received. When the response is received (step S24:YES), the process proceeds to step S26. When the response is not received (step S24:NO), the process proceeds to step S25.

The service center 12 determines whether the ID code transmitted from the emergency report device 1 is registered. That is, the service center 12 responds to the ID code from the emergency report device 1 with an affirmative response signal for confirming registration of the ID code when the ID code is, for example, registered in the service center 12 in an appropriate format in advance. The service center 12 responds to the ID code from the emergency report device 1 with a negative response signal for confirming non-registration of the ID code when the ID code is not registered in the service center 12. The affirmative/negative response is transmitted to the emergency report device 1.

In step S25, the elapsed time is compared with a predetermined period. When the elapsed time is within the predetermined period, that is, the response from the service center 12 is received within the predetermined period, the process returns to step S24. When the elapsed time is not within the predetermined period, the process proceeds to step S28.

In step S26, the controller 2 determines whether the ID code is registered in the service center 12 by analyzing the response from the service center 12. When the response is in the affirmative (step S26:YES), the process proceeds to step S27. When the response is not in the affirmative (step S26: NO), the process proceeds to step S28.

In step S27, the controller 2 stores the registration condition as "REG (registered)" in the registration condition storage 6. The process proceeds to step S29 after storing the registration condition.

In step S28, the controller 2 stores the registration condition as "NO-REG (not registered)" in the registration condition storage 6. The process proceeds to step S29 after storing the registration condition.

In step S29, the controller 2 determines registration condition of the ID code in the service center 12. When the ID code is in the registered condition (step S29: "REG"), the process proceeds to step S30. When the ID code is in the not-registered condition (step S29: "NO-REG"), the process proceeds to step S33.

In step S30, the controller 2 determines whether the emergency report operation of the emergency report device 1 corresponding to an emergency report transmission trigger is allowed. The process proceeds to step S32 when the emergency report operation is allowed (step S30:YES). The process proceeds to step S31 when the emergency report operation is not allowed (step S30:NO).

In step S31, the controller 2 permits the emergency report operation of the emergency report device 1 corresponding to the emergency report transmission trigger.

In step S32, the controller 2 displays a message that represents registration of the ID code in the service center 12 on the display 9. The message may take a form of a text message such as "ID code registered in the service center."

In step S33, the controller 2 determines whether the emergency report operation of the emergency report device 1 corresponding to an emergency report transmission trigger is prohibited. The process proceeds to step S35 when the emergency report operation is prohibited (step S33:YES). The process proceeds to step S34 when the emergency report operation is not prohibited (step S33:NO).

In step S34, the controller 2 prohibits the emergency report operation of the emergency report device 1 corresponding to the emergency report transmission trigger.

In step S35, the controller 2 displays a message that represents absence of registration of the ID code in the service center 12 on the display 9. The message may take a form of a text message such as "ID code not registered in the service center."

The confirmation of the ID code registration by the user from the emergency report device 1 is conducted in the above-described manner. That is, the confirmation to the service center 12 is responded either in the affirmative or in the negative, and the condition of the registration is displayed as a text message or the like for the user. Provision of the emergency service corresponding the emergency report transmission trigger is permitted when the ID code registration is affirmatively confirmed. Provision of the emergency service corresponding the emergency report transmission trigger is prohibited when the ID code registration is not affirmatively confirmed. In this manner, the emergency report device 1 serves the user with recognition of registration condition of the ID code in the service center 12, thereby enabling the user to be disposed in a well-informed condition in terms of the availability of the emergency report service in such a case as an operation of the emergency button, deployment of the airbag or the like.

The emergency report device 1 in the present embodiment provides a text message that informs the user of no-registration confirmation in an above described manner when the navigation system 15 is replaced with a new one due to breakdown or the like. In other words, during "no-registration" period of the ID code, that is, before the ID code registration in the service center 12 is confirmed by the emergency report device 1, information on un-availability of the emergency report device 1 is appropriately reported to the user. Therefore, the user is disposed in a well-informed condition regarding the availability of the emergency report device 1.

Although the present invention has been fully described in connection with the preferred embodiment thereof with reference to the accompanying drawings, it is to be noted that various changes and modifications will become apparent to those skilled in the art.

For example, the emergency report device 1 may be constructed as a part of a navigation system.

Further, the emergency report transmission may be triggered by a signal or operation that is different from the output from the operation of the emergency button, deployment of the airbag, or the like.

Furthermore, the external device may be a system or a device that is different from the navigation system.

Furthermore, the scheme of the operation of the emergency report device 1 may be applied to a situation that is different from replacement of the external device due to breakdown. That is, for example, the external device may be replaced due to purchase of a new product.

Furthermore, the registration condition of the ID code may be informed to the user by using a device other than the display for displaying the text message. That is, the registration condition of the ID code may be outputted as a sound message accompanied by the text message. The registration condition may also be informed to the user by turning on/off of a green light emitting diode (LED).

Such changes and modifications are to be understood as being within the scope of the present invention as defined by the appended claims.

What is claimed is:

1. An emergency report device, the emergency report device used in combination with an emergency report system having a service center for providing an emergency service upon receiving a registered identification code that identifies a specific emergency report device, the emergency report device comprising:

means for notifying a condition of the emergency report device to a user;

means for receiving the identification code from an external device when the external device is coupled with the emergency report device;

means for storing the identification code received by the receiving means;

a transmitter for transmitting an emergency report; and a controller for controlling the transmitter in response to a transmission trigger signal, wherein the transmission trigger signal is provided from a predetermined device, transmission of the emergency report from the transmitter of the emergency report device in response to the transmission trigger signal is prohibited when the identification code received by the receiving means is not identical with the identification code stored in the storing means, the notifying means notifies the user of an absence of registration of the identification code in the service center, and prohibition of transmission of the emergency report from the transmitter is terminated when the registration of the identification code in the service center is confirmed by the controller.

2. The emergency report device as in claim 1, wherein the controller permits the transmitter to transmit the emergency report upon provision of the emergency report transmission trigger when the identification code received by the receiving means from the external device is identical with the identification code stored in the storing means, and the notifying means notifies the user of existence of registration of the identification code in the service center.

3. The emergency report device as in claim 1, wherein the external device is a navigation system.

4. A method for transmitting an emergency report from an emergency report device to a service center of an emergency report system, the emergency report device having a display, a receiver, a memory, a transmitter, and a controller, the method comprising;

receiving an identification code that identifies a specific emergency reporting device from an external device by the receiver;

comparing the identification code received by the receiver with the identification code stored in the memory; and determining whether the identification code received by the receiver is identical with the identification code stored in the memory, controlling the transmitter for transmitting an emergency report to the service center, wherein the controller prohibits transmission of the emergency report from the transmitter and displays notification on the display that informs the user of an absence of registration of the identification code in the service center when the received identification code is not identical with the stored identification code in the memory.

5. The method for transmitting an emergency report as in claim 4, wherein the controller permits transmission of the emergency report from the transmitter and displays notification on the display that informs the user of existence of registration of the identification code in the service center when the received identification code is identical with the stored identification code in the memory.

6. The method for transmitting an emergency report as in claim 4, wherein the step of receiving the identification code includes receiving the identification code from a navigation system.

7. An emergency report device, the emergency report device used in combination with an emergency report system having a service center for providing an emergency service upon receiving a registered identification code that identifies a specific emergency report device ,the emergency report device comprising:

means for notifying a condition of the emergency report device to a user;

means for receiving the identification code from an external device when the external device is coupled with the emergency report device;

means for storing the identification code received by the code receiving means;

a transmitter for transmitting an emergency report; and a controller for controlling the transmitter in response to a transmission trigger signal; wherein a transmission trigger signal is provided for the controller from a predetermined outside device, when the identification code received by the receiving means is not identical with the identification code that identifies the individual emergency report device stored in the storing means, until the registration in the service center of the identification code received by the receiving means is confirmed by the controller, the notifying means notifies the user of an absence of registration, in the service center, of the identification code received by the receiving means.

8. The emergency report device as in claim 7, wherein the outside device is a navigation system.

* * * * *

UNITED STATES PATENT AND TRADEMARK OFFICE

CERTIFICATE OF CORRECTION

PATENT NO. : 7,587,489 B2
APPLICATION NO. : 11/446757
DATED : September 8, 2009
INVENTOR(S) : Yoshio Koie It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this

Twenty-first Day of September, 2010

David J. Kappos

*Director of the United States Patent and Trademark Office*